(12) United States Patent  
Carboni

(10) Patent No.: US 8,402,727 B2  
(45) Date of Patent: Mar. 26, 2013

(54) STALK-CHOPPER AND MACHINE FOR HARVESTING MAIZE EQUIPPED WITH SUCH STALK-CHOPPER

(75) Inventor: Lorenzo Carboni, Margarita (IT)

(73) Assignee: Olimac S.r.l., Margarita (CN) (IT)

( * ) Notice: Subject to any disclaimer, the term of this patent is extended or adjusted under 35 U.S.C. 154(b) by 15 days.

(21) Appl. No.: 12/966,919

(22) Filed: Dec. 13, 2010

(65) Prior Publication Data

US 2011/0146217 A1    Jun. 23, 2011

(30) Foreign Application Priority Data

Dec. 18, 2009  (EP) .................................. 09425514

(51) Int. Cl.  
*A01D 45/02* (2006.01)
(52) U.S. Cl. .......................................................... 56/60
(58) Field of Classification Search ............... 56/53, 60, 56/101–103, 106, 98, 500, 503, 504  
See application file for complete search history.

(56) References Cited

U.S. PATENT DOCUMENTS

| 1,128,504 | A | * | 2/1915 | Pittman ........................... 56/102 |
| 3,931,859 | A | * | 1/1976 | van der Lely ................. 172/247 |
| 5,330,114 | A | | 7/1994 | Trenkamp et al. |
| 6,237,312 | B1 | | 5/2001 | Becker |

FOREIGN PATENT DOCUMENTS

| DE | 19815571 A1 | 10/1999 |
| EP | 0653152 A1 | 5/1995 |

OTHER PUBLICATIONS

European Search Report for European Application No. 09425514.8 dated Jul. 2, 2010.

* cited by examiner

*Primary Examiner* — Thomas B Will  
*Assistant Examiner* — Mai Nguyen  
(74) *Attorney, Agent, or Firm* — Patterson & Sheridan, L.L.P.

(57) ABSTRACT

A stalk-chopper, in particular for a machine for harvesting maize, comprising a hollow casing having a central portion and two box-section arms that extend in cantilever fashion from the central portion according to a U-shaped configuration, the box-section arms being set at a distance from one another in a transverse direction and having respective distal ends set at a distance from the central portion in a longitudinal direction, two rotating output members projecting on the outside of said box-section arms at the respective distal ends of said box-section arms, the output members being carried in a rotatable way by the respective arms about respective mutually parallel axes of rotation, two rotary cutting devices connected to respective output members and having respective cutting diameters partially overlapping one another; and a transmission device housed within said hollow casing and provided for driving said output members in rotation in concordant directions.

6 Claims, 6 Drawing Sheets

US 8,402,727 B2

STALK-CHOPPER AND MACHINE FOR HARVESTING MAIZE EQUIPPED WITH SUCH STALK-CHOPPER

CROSS-REFERENCE TO RELATED APPLICATIONS

This application claims benefit of European patent application number 09425514.8, filed Dec. 18, 2009, which is herein incorporated by reference.

BACKGROUND OF THE INVENTION

1. Field of the Invention

The present invention relates to a stalk-chopper designed to be mounted on a machine for harvesting maize and a machine for harvesting maize equipped with said stalk-chopper.

2. Description of the Related Art

Machines for harvesting maize of the most widely used type comprise a supporting structure designed to be fixed to the combine harvester and carrying a plurality of harvesting units set alongside one another in a transverse direction. Each harvesting unit is dedicated to the harvesting of a row of maize plants. Each harvesting unit usually comprises a fixed framework carrying two stripper plates. Said stripper plates have respective edges facing one another that form a squeezing channel for the maize stalks. Each harvesting unit comprises a pair of counter-rotating traction rollers arranged underneath the squeezing channel. The traction rollers grip the maize stalks and draw them downwards, passing the stalks between the facing edges of the stripper plates. The cobs of maize come into contact with the top surfaces of the stripper plates and are detached from the stalks as a result of the stalks being drawn down by the traction rollers.

Machines for harvesting maize can be equipped with integrated stalk-choppers designed to carry out chopping of the maize stalks. In the most widespread solutions, each harvesting unit comprises a stalk-chopper of its own, which includes a rotary cutting device set underneath the traction rollers.

SUMMARY OF THE INVENTION

The object of the present invention is to provide a stalk-chopper, in particular for a machine for harvesting maize, which will enable more effective chopping of the stalks than stalk-choppers according to the prior art.

According to the present invention, this object is achieved by a stalk-chopper comprising a hollow casing having a U-shaped configuration with the two arms that carry at their distal ends two output members that are able to turn about respective mutually parallel axes of rotation, the output members carrying two rotary cutting devices having respective cutting diameters partially overlapping one another and driven in rotation in concordant directions.

With the stalk-chopper according to the present invention, cutting of the stalks is performed between two blades that move in opposite directions, according to a shearing mode. The cutting of the stalks is more effective as compared to the solutions of a known type, where cutting is performed by a single rotor.

The present invention moreover relates to a machine for harvesting maize including a stalk-chopper of the type referred to above.

BRIEF DESCRIPTION OF THE DRAWINGS

The present invention will now be described in detail with reference to the annexed drawings, which are provided purely by way of non-limiting example and in which.

DETAILED DESCRIPTION

Figure 1:
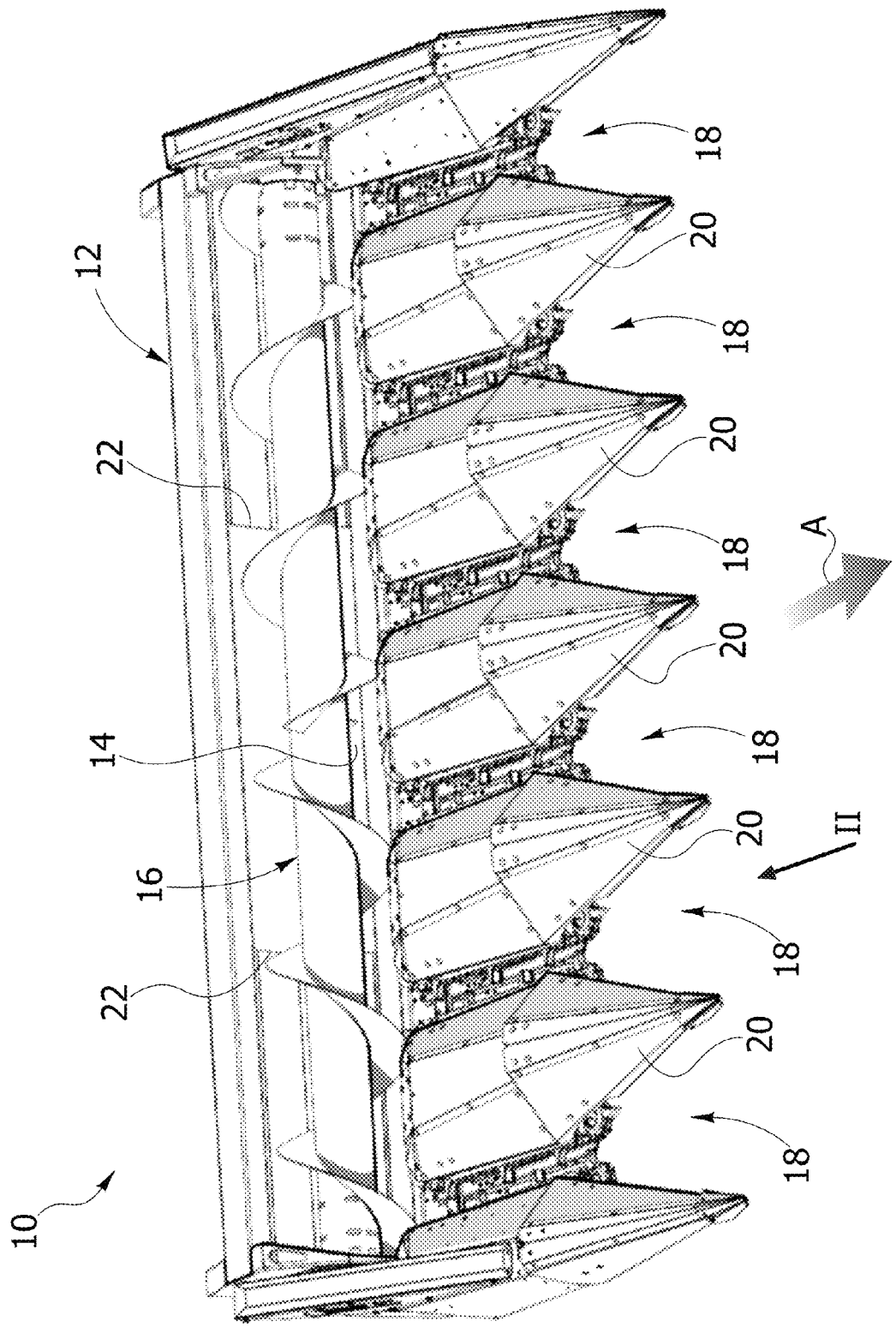
FIG. 1 is a perspective view of a machine for harvesting maize according to the present invention.

With reference to FIG. 1, designated by 10 is a machine for harvesting maize designed to be applied to the front part of a combine harvester of a conventional type (not illustrated). The machine 10 comprises a supporting structure 12 equipped with means (not illustrated) for connection to the thresher. The supporting structure 12 has a transverse conveying channel 14, associated to which is a worm conveyor 16.

The supporting structure 12 carries a plurality of harvesting units 18 set alongside one another in a transverse direction with respect to the direction of advance of the machine 10, indicated by the arrow A in FIG. 1. Separation prongs 20 are arranged between adjacent harvesting units 18. The harvesting units 18 carry out detachment of the cobs from the maize stalks in the way that will be described in what follows. The harvesting units 18 convey the cobs towards the conveying channel 14. The worm conveyor 16 conveys the cobs contained in the conveying channel 14 towards openings 22 of the supporting structure 12, which face respective loading mouths of the combine harvester.

Figure 2:
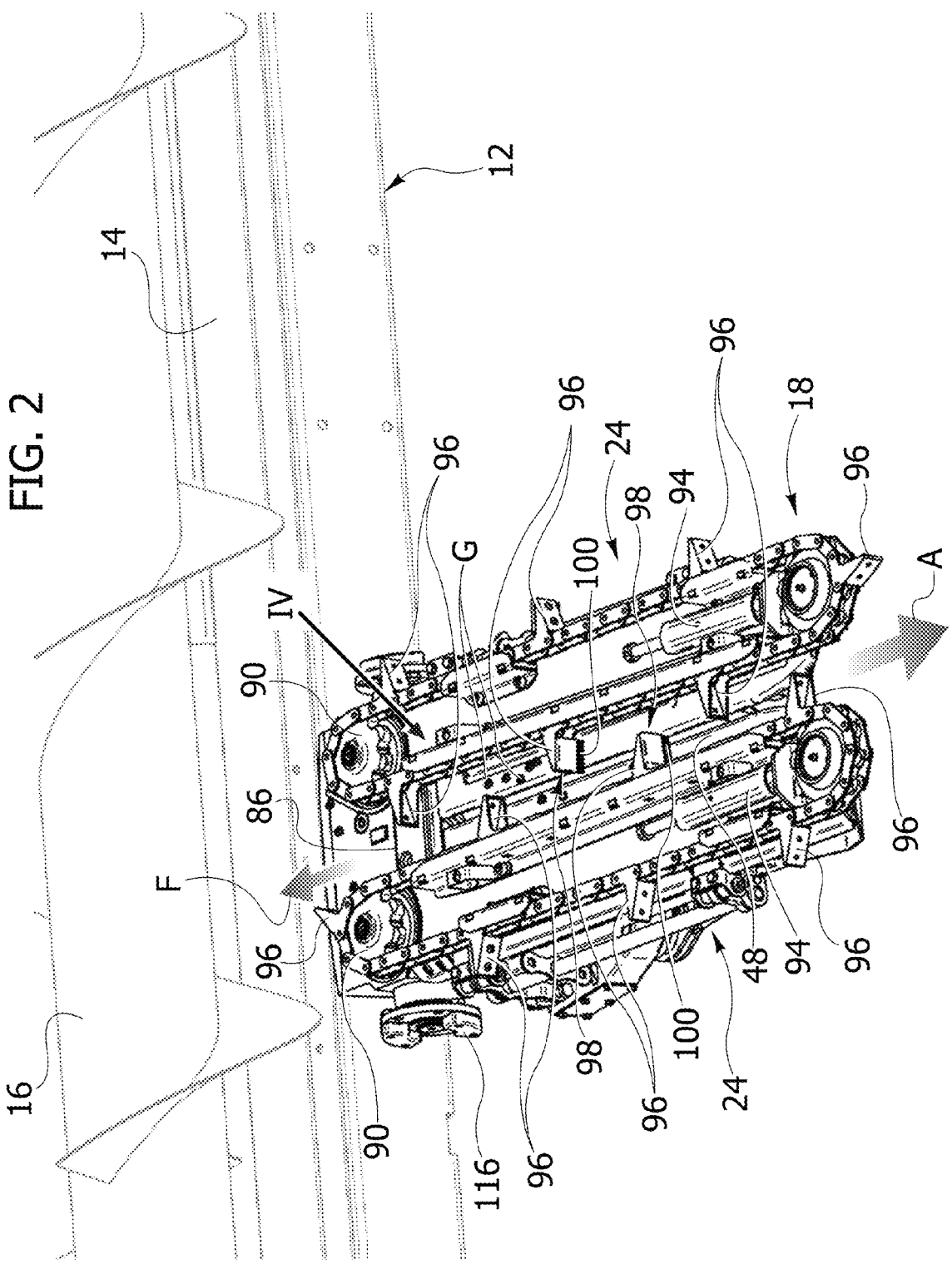
FIG. 2 is a perspective view of a harvesting unit indicated by the arrow II in FIG. 1.
Figure 3:
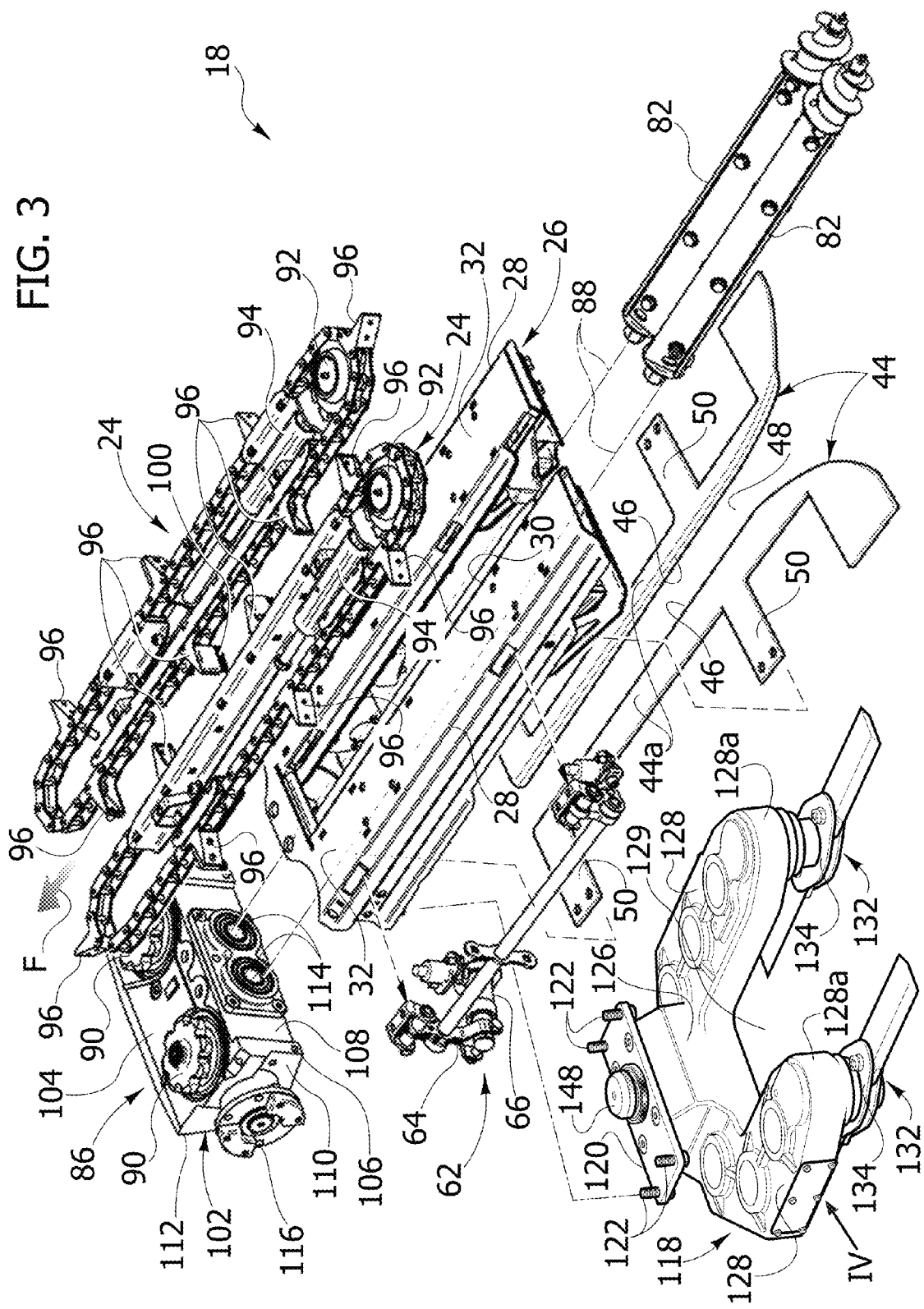
FIG. 3 is an exploded perspective view of the harvesting unit of FIG. 2.

With reference to FIGS. 2 and 3, each harvesting unit 18 comprises a framework 26 fixed with respect to the supporting structure 12. The framework 26 comprises two box sections 28, preferably made of sheet metal, set at a distance from one another in a transverse direction by an empty space 30 elongated in a longitudinal direction. The box sections 28 have respective mutually coplanar plane top walls 32 that extend on opposite sides of the empty space 30.

Each harvesting unit 18 comprises two stripper plates 44 carried by the respective box sections 28 of the fixed framework 26. The stripper plates 44 have respective preferably plane top surfaces 44a and respective edges 46 facing one another. The stripper plates 44 extend within the respective box-section portions 28. The parts of the stripper plates 44 adjacent to the edges 46 project on the outside of the box-section portions 28 and extend on opposite sides in the empty space 30 defined between the box sections 28. The facing edges 46 define a squeezing channel 48 elongated in a longitudinal direction A. The stripper plates 44 have respective appendages 50 that extend on the outside of the box section 28 on the opposite side of the squeezing channel 48.

Preferably, the stripper plates 44 are mobile in a vertical direction with respect to the respective box sections 28 between a raised position and a lowered position and are associated to respective spring devices (not visible in the drawings) that push the stripper plates 44 elastically towards the respective raised positions.

Preferably, the stripper plates 44 are associated to an automatic adjustment mechanism 62 that automatically adapts the width of the squeezing channel 48 to the size of the maize stalks. The adjustment mechanism 62 comprises, for each stripper plate 44, a rocker 64 and an elastic device 66. Each rocker 64 is articulated in a central part thereof to the respective box section 28. The top end of each rocker 64 is articulated to a respective appendage 50 of a stripper plate. The bottom end of each rocker 64 is articulated to a mobile element of the elastic device 66. The forces produced by the elastic devices 66 push the edges 46 of the stripper plates 44 towards one another in such a way that the edges 46 are constantly pressed against the maize stalks entering the squeezing channel 48. The stripper plates 44 move in a transverse direction according to the diameter of the stalks entering the squeezing channel 48. Consequently, the width of the squeezing channel 48 automatically adapts to the diameter of the stalks.

With reference to FIG. 3, each harvesting unit 18 comprises a pair of counter-rotating traction rollers 82 arranged underneath the squeezing channel 48. The traction rollers 82 are carried in cantilever fashion by a respective transmission assembly 86 fixed to the supporting structure 12. The transmission assembly 86 drives the rollers 82 in rotation about respective mutually parallel longitudinal axes 88. The traction rollers 82 are preferably equipped with blades designed to grip the stalks that are in the squeezing channel 48.

The rotation of the traction rollers 82 causes a traction of the stalks in a vertical direction. The maize stalks enter the squeezing channel 48 as a result of the advance of the machine 10 in the direction A. The rollers 82 draw the stalks that are in the squeezing channel 48 downwards. The edges 46 of the stripper plates 44 are pressed against the stalks so that the width of the squeezing channel 48 is equal to the diameter of the stalks. The cobs come into contact with the top surfaces 44a of the stripper plates 44. The action of drawing downwards of the stalks caused by the rotation of the traction rollers 82 brings about detachment of the cobs from the stalks. The detached cobs remain on the top surface 44a of the stripper plates 44.

Each harvesting unit 18 comprises a pair of harvesting chains 24. The harvesting chains 24 are arranged on top of the respective box sections 28 of the framework 26. Each harvesting chain 24 is wound in a closed loop on a drive gear 90 and on a return gear 92. The drive gears are driven in rotation about respective vertical axes by the transmission assembly 86. The return gears 92 are preferably carried by respective spring tensioners 94 fixed to the top walls 32 of the box sections 28.

With reference to FIGS. 2 and 3, each harvesting chain 24 carries a plurality of thrust elements 96 that project from the outer side of the respective chain 24. The thrust elements 96 push the cobs that lie on the top surfaces 44a of the stripper plates 44 in a direction of harvesting F opposite to the direction of advance A. The thrust elements 96 convey the cobs towards the transverse conveying channel 14. Preferably, at least one of the thrust elements 96 of each chain 24 carries a member for gathering the grains 98 designed to convey in the direction of harvesting F the loose grains of maize G that lie on the top surfaces 44a of the stripper plates 44. Preferably, each member for gathering the grains 98 has a flexible contact portion 100 that slides against the top surface 44a.

With reference to FIG. 3, the transmission assembly 86 of each harvesting unit 18 comprises a parallelepipedal casing 102 having a top face 104, a bottom face 106, a front face 108, two side faces 110, and a rear face 112. The rear face 112 is fixed to the supporting structure 12. The drive gears 90 that drive the harvesting chains 24 are arranged on top of the top face 104. Provided on the front face 108 are rotating output members 114 coupled to which are the traction rollers 82. Provided on the side faces 110 are coupling members 116 connected to corresponding coupling members of adjacent harvesting units. A coupling member 116 of one of the harvesting units is connected to a transmission (not illustrated) designed to be connected to a power offtake of the thresher. Housed within the casing 102 is a gear mechanism that connects the coupling members 116, the drive gears 90, and the output members 114 operatively to one another.

Figure 4:
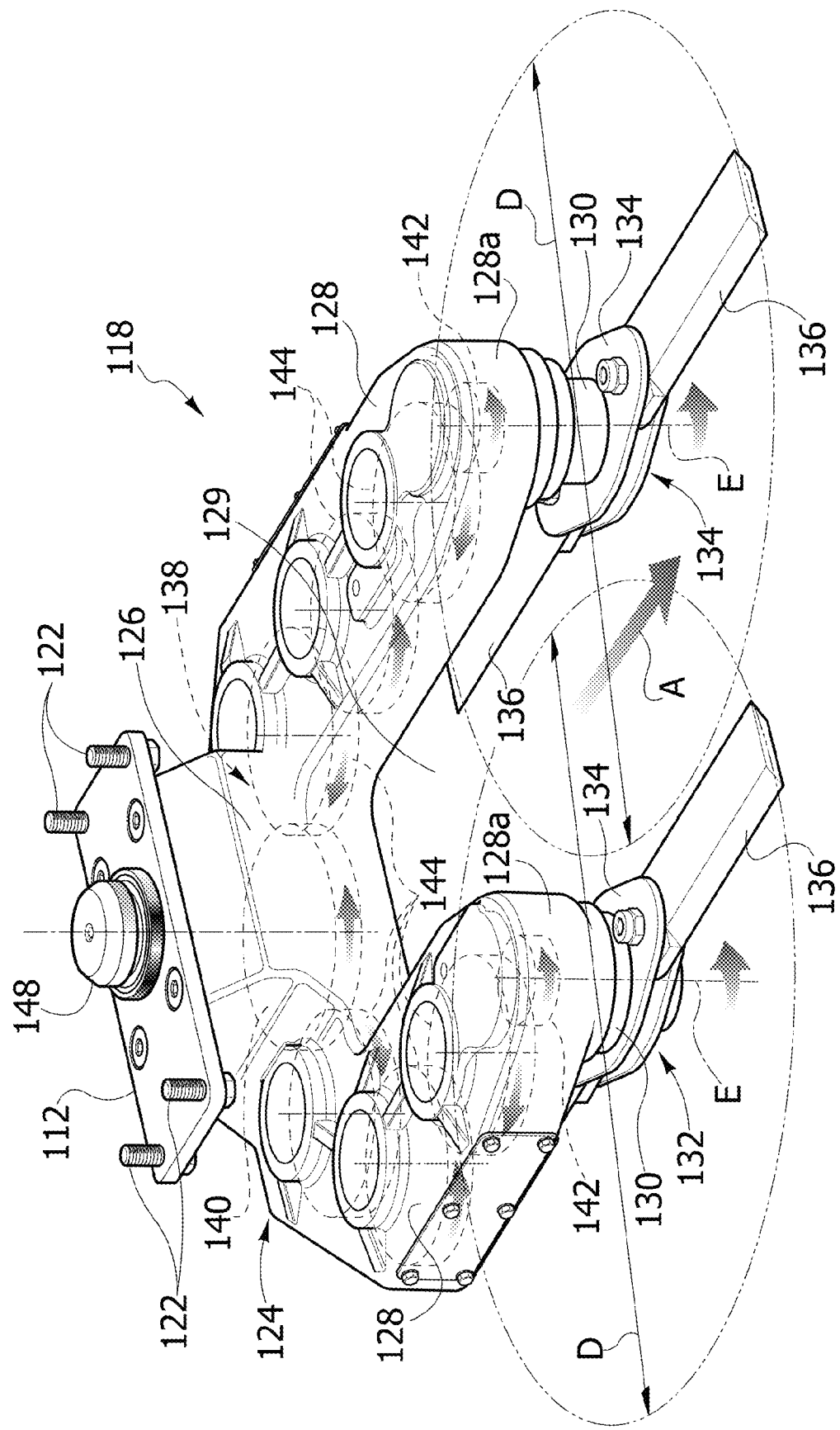
FIG. 4 is a perspective view at a larger scale of the stalk-chopper indicated by the arrow IV in FIG. 3.

With reference to FIGS. 3 and 4, each harvesting unit 18 comprises a respective stalk-chopper 118. The stalk-chopper 118 comprises a fixing plate 120 connected, for example by means of screws 122, to the bottom face 106 of the transmission assembly 86. The stalk-chopper 118 comprises a hollow casing 124 having a general U shape. The hollow casing 124 comprises a central portion 126 and two arms 128 that extend in cantilever fashion from the central portion 126. The arms 128 are set at a distance from one another in a transverse direction and have respective distal ends 128a set at a distance from the central portion 126 in the longitudinal direction A so as to form an empty space 129 closed on three sides by the arms 128 and by the central portion 126.

Figure 5:
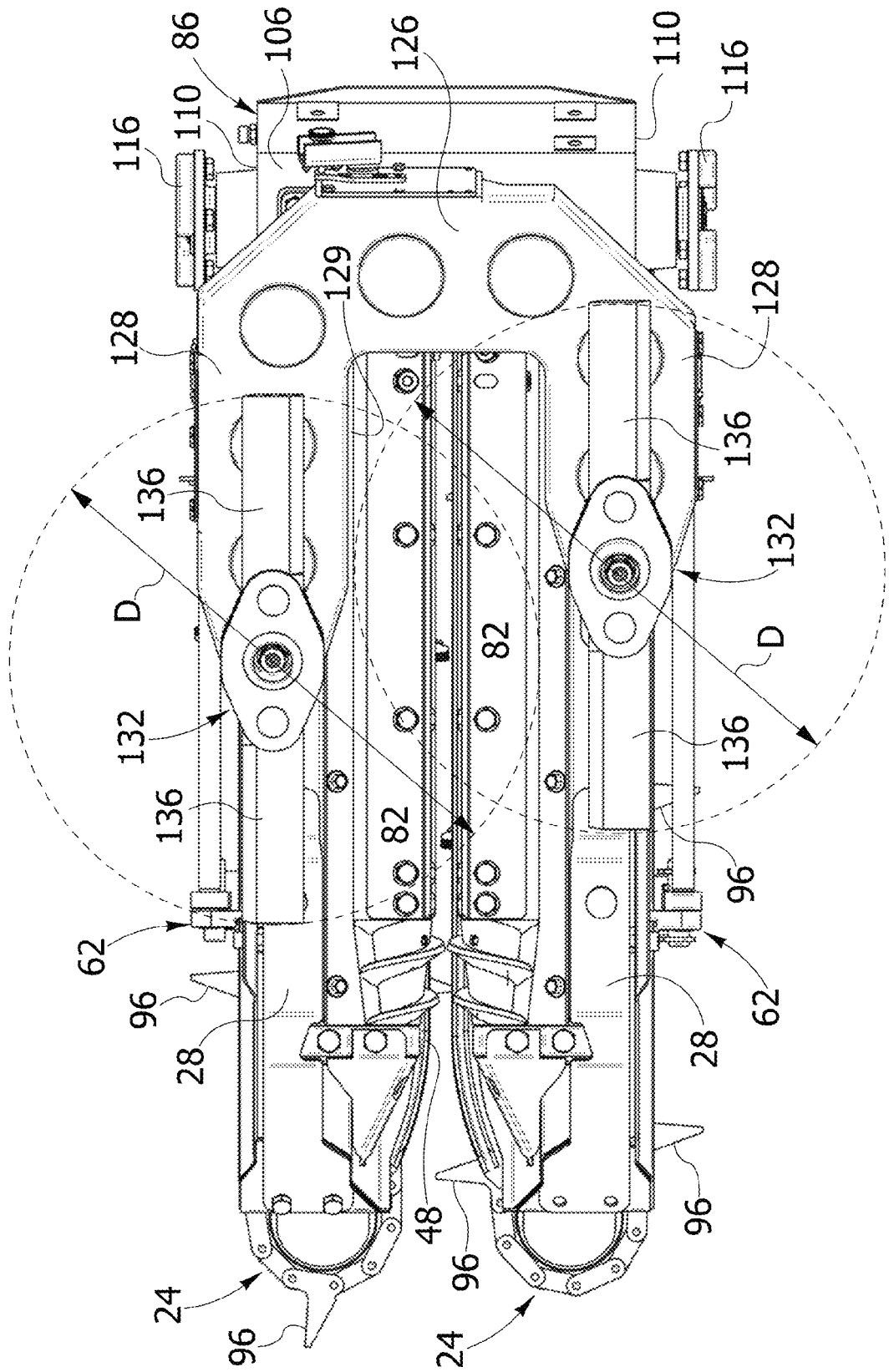
FIGS. 5 and 6 are respectively a plan view from beneath and a side view of the harvesting unit of FIG. 2.

With reference to FIGS. 3 and 5, the arms 128 of the hollow casing 124 are arranged underneath the box sections 28 and are shifted laterally outwards with respect to the traction rollers 82. The squeezing channel 48 and the traction rollers are positioned above the empty space 129.

The arms 128 carry two output members 130 that project on the outside of the box-section arms 128 at the respective distal ends 128a. The output members 130 are carried in a rotatable way by the respective arms 128 about respective mutually parallel axes of rotation E.

With reference to FIG. 4, the stalk-chopper 118 comprises two rotary cutting devices 132 connected to respective output members 130. Preferably, each cutting device 132 comprises a hub 134 fixed to the respective output member 130, and two blades 136 fixed to the hub 134 and diametrically opposite to one another with respect to the axis of rotation E. The number of the blades and their arrangement could vary with respect to what is illustrated.

With reference to FIGS. 4 and 5, the cutting devices 132 have respective cutting diameters D that partially overlap one another. For the cutting diameters D to partially overlap one another the distance between the axes of rotation E must be smaller than the cutting diameter D. In the case where the cutting diameters D are different from one another, the distance between the axes of rotation E must be less than the mean value of the cutting diameters.

To avoid any interference the distance between the axes of rotation must moreover be greater than the cutting radius or greater than the largest cutting radius in the case of different cutting diameters.

Figure 6:
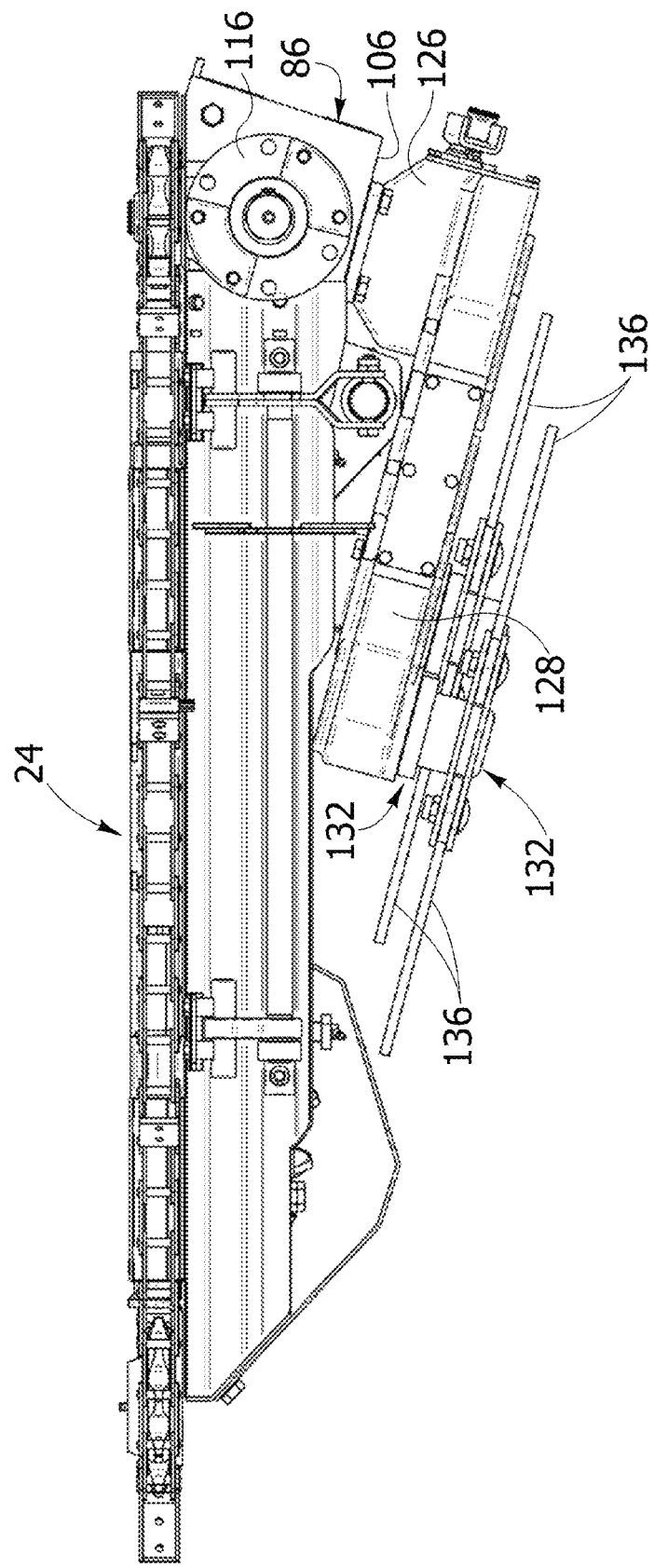

With reference to FIG. 6, to avoid any interference the blades 136 of the cutting devices 132 are staggered with respect to one another in a direction parallel to the axes of rotation E.

With reference to FIG. 4, the stalk-chopper 18 comprises a transmission device 138 housed within the hollow casing 124. The transmission device 138 is provided for driving the cutting devices 132 in rotation in concordant directions about the respective axes of rotation E.

In other words, in operation the cutting devices 132 turn both in a clockwise and in a counterclockwise direction.

In the embodiment illustrated, the transmission device 138 comprises a central gear 140, two output gears 142, and two series of return gears 144, cascaded between the central gear 140 and the output gear 142. The transmission device 138 could be made differently from what has been illustrated, for example with chain transmissions or transmissions of another type.

The output gears 142 are fixed to the respective output members 130. The central gear 140 is fixed to an input member 148 that projects on the outside of the hollow casing 124. With reference to FIG. 3, the input member 148 is connected to a corresponding output member (not visible) of the transmission assembly 86 positioned on the bottom face 106 of the casing 102.

The rotation in concordant directions of the cutting devices 132 means that, in the area of overlapping of the cutting diameters D, the blades 136 move in opposite directions to one another. Consequently, in operation, the blades 136 carry out a shearing of the stalks whilst these are pushed into the empty space 129 by the traction rollers 82. The shearing performs a finer and more effective chopping of the stalks as compared to stalk-chopper of a known type.

The stalk-chopper according to the invention is particularly suited for use in machines for harvesting maize, but could also be used in agricultural machines of another type.

While the foregoing is directed to embodiments of the present invention, other and further embodiments of the invention may be devised without departing from the basic scope thereof, and the scope thereof is determined by the claims that follow.

The invention claimed is:

1. A stalk-chopper, in particular for a machine for harvesting maize, comprising:
   a hollow casing having a central portion and two box-section arms that extend in cantilever fashion from the central portion according to a U-shaped configuration, the box-section arms being set at a distance from one another in a transverse direction and having respective distal ends set at a distance from the central portion in a longitudinal direction;
   two rotating output members projecting on the outside of said box-section arms at the respective distal ends of said box-section arms, the output members being carried in a rotatable way by the respective arms about respective mutually parallel axes of rotation;
   two rotary cutting devices connected to respective output members and having respective cutting diameters partially overlapping one another; and
   a transmission device housed within said hollow casing and provided for driving said output members in rotation in concordant directions, wherein said transmission device comprises a central gear in said central portion, an output gear connected to each said rotating output member, and a series of return gears that are disposed within each said box section arm and are cascaded between said central gear and said output gears.

2. The stalk-chopper according to claim 1, wherein the distance between said axes of rotation is smaller than the cutting diameter or than the mean cutting diameter of said rotary cutting devices.

3. The stalk-chopper according to claim 2, wherein the distance between said axes of rotation is greater than the cutting radius or than a larger cutting radius of said rotary cutting devices.

4. The stalk-chopper according to claim 1, wherein the number of return gears in each said box section arm are the same.

5. A machine for harvesting maize, comprising a supporting structure carrying a plurality of harvesting units set alongside one another in a transverse direction, wherein each harvesting unit comprises:
   a framework, which is fixed with respect to the supporting structure and includes two box sections set at a distance from one another in a transverse direction by an empty space elongated in a longitudinal direction;
   two stripper plates carried by respective box sections, the stripper plates having respective top surfaces and respective edges facing one another that extend on opposite sides in said empty space, the facing edges of said stripper plates forming a squeezing channel;
   a pair of counter-rotating traction rollers arranged underneath said squeezing channel, which are provided for drawing downwards stalks of maize plants contained in said squeezing channel in such a way that, in operation, the cobs of the maize plants contained in said squeezing channel are detached from the respective stalks and gather on said top surfaces of said stripper plates;
   a pair of harvesting chains, which move along respective closed-loop paths and are equipped with respective thrust elements, which move on top of respective top surfaces of said stripper plates for drawing in a direction of harvesting the cobs that lie on said stripper plates; and
   a stalk-chopper device set underneath said traction rollers and comprising:
      a hollow casing having a central portion and two box-section arms that extend in cantilever fashion from the central portion according to a U-shaped configuration, the box-section arms being set at a distance from one another in a transverse direction and having respective distal ends set at a distance from the central portion in a longitudinal direction;
      two rotating output members projecting on the outside of said box-section arms at the respective distal ends of said box-section arms, the output members being carried in a rotatable way by the respective arms about respective mutually parallel axes of rotation;
      two rotary cutting devices connected to respective output members and having respective cutting diameters partially overlapping one another; and
      a transmission device housed within said hollow casing and provided for driving said output members in rotation in concordant directions, wherein said transmission device comprises a central gear in said central portion, an output gear connected to each said rotating output member, and a series of return gears that are disposed within each said box section arm and are cascaded between said central gear and said output gears.

6. The machine according to claim 5, wherein the number of return gears in each said box section arm are the same.

* * * * *